(12) United States Patent
Han

(10) Patent No.: US 8,801,989 B2
(45) Date of Patent: Aug. 12, 2014

(54) MANUFACTURING METHOD FOR RUBBER BAND

(76) Inventor: Yong Han, Guangdong Province (CN)

( * ) Notice: Subject to any disclaimer, the term of this patent is extended or adjusted under 35 U.S.C. 154(b) by 826 days.

(21) Appl. No.: 13/043,372

(22) Filed: Mar. 8, 2011

(65) Prior Publication Data

US 2012/0228798 A1     Sep. 13, 2012

(51) Int. Cl.
| | |
|---|---|
| *B29C 71/00* | (2006.01) |
| *B29C 39/00* | (2006.01) |
| *C08L 83/04* | (2006.01) |
| *A45D 8/14* | (2006.01) |
| *C08J 7/06* | (2006.01) |
| *B29D 29/00* | (2006.01) |
| *B29C 71/02* | (2006.01) |
| *B29K 83/00* | (2006.01) |
| *C08G 77/16* | (2006.01) |
| *C08G 77/20* | (2006.01) |

(52) U.S. Cl.
CPC ............... *B29C 39/003* (2013.01); *C08J 7/08* (2013.01); *C08J 7/06* (2013.01); *B29D 29/00* (2013.01); *B29C 71/0009* (2013.01); *B29C 71/02* (2013.01); *B29K 2083/00* (2013.01); *C08G 77/16* (2013.01); *C08G 77/20* (2013.01); *C08L 83/04* (2013.01)
USPC ........... 264/234; 264/235; 264/236; 264/319; 264/330

(58) Field of Classification Search
CPC ........ B29C 71/0009; B29C 71/02; C08J 7/06; C08J 7/08
USPC .......................... 264/234, 235, 236, 319, 330
See application file for complete search history.

(56) References Cited

U.S. PATENT DOCUMENTS 8,721,948 B2 *   5/2014   Sano et al. ................. 264/234

FOREIGN PATENT DOCUMENTS

| CN | 102219916 A | * | 10/2011 |
| JP | 06182904 A | * | 7/1994 |

* cited by examiner

*Primary Examiner* — Atul P. Khare

(57) ABSTRACT

The present invention relates to a manufacturing method for a rubber band, comprising preparing a production raw material: mixing and stirring by weight percent 50%-80% vinyl-terminated polydimethylmethylvinylsiloxane, 19%-40% silica and 1%-10% hydroxy-terminated polydimethylsiloxane into a paste ready for use; feeding the aforementioned production raw material into forming molds to produce rough rubber bands; soaking the rough rubber bands in a surface treatment solution for a certain time period, wherein the surface treatment solution comprises by weight percent 40%-50% methyl vinyl silicone rubber, 30%-35% deodorized kerosene, 7%-10% oxygen-containing silicon oil and 10%-20% silicon powder; taking the soaked rough rubber bands out of the solution after soaking and baking them at a high temperature of 200-250° C. A rubber band made according to the above-described method has good elasticity, a non-slip property, no cracks after stretching, is not easy to be broken, durable, non-toxic, environmentally friendly and nondeformable for multiple times of use.

1 Claim, No Drawings

MANUFACTURING METHOD FOR RUBBER BAND

BACKGROUND OF THE INVENTION

1. Field of the Invention

The present invention relates to the field of articles for daily use, and more particularly to a manufacturing method for a rubber band.

2. Description of the Prior Art

It is well-known that rubber bands are widely used in daily life, for example, used to tie hair, to fasten pockets, for kids to skip and dance over a chain of rubber bands, due to the characteristics of good elasticity, light weight and the like. Traditional rubber bands are rubber-based, which have low elasticity and strength, a short service life, and easily age. Therefore, it is obviously disadvantageous to popularization on the market.

SUMMARY OF THE INVENTION

A primary object of the present invention is to provide a manufacturing method for a highly elastic, environmentally friendly and durable rubber band.

In order to achieve the foregoing object, the present invention adopts the following technical solution:

A manufacturing method for a rubber band, comprising preparing a production raw material: mixing and stirring by weight percent 50%-80% vinyl-terminated polydimethylmethylvinylsiloxane, 19%-40% silica and 1%-10% hydroxy-terminated polydimethylsiloxane into a paste ready for use; feeding the aforementioned production raw material into forming molds to produce rough rubber bands; soaking the rough rubber bands in a surface treatment solution for a certain time period, wherein the surface treatment solution comprises by weight percent 40%-50% methyl vinyl silicone rubber, 30%-35% deodorized kerosene, 7%-10% oxygen-containing silicon oil and 10%-20% silicon powder; taking the soaked rough rubber bands out of the surface treatment solution after soaking and baking them at a high temperature of 200-250° C.

The advantages of the present invention are that a rubber band made according to the above-described method has good elasticity, a non-slip property, no cracks after stretching, is not easy to be broken, durable, non-toxic, environmentally friendly and nondeformable for multiple times of use.

BRIEF DESCRIPTION OF THE DRAWINGS

None

DETAILED DESCRIPTION OF THE PREFERRED EMBODIMENTS

The present invention will be further described in the following by way of example.

Example 1

Preparation of a production raw material: 55% by weight percent vinyl-terminated polydimethylmethylvinyl-siloxane, 35% by weight percent silica and 10% by weight percent hydroxy-terminated polydimethylsiloxane are selected and mixed together by sufficient stirring to give a paste ready for use;

Forming: the above-described production raw material is fed into forming molds to produce rough rubber bands at a high temperature of 200° C.;

Surface treatment: the rough rubber bands are soaked in a surface treatment solution for 10 seconds, wherein the formulation of the surface treatment solution contains by weight percent 40% methyl vinyl silicone rubber, 32% deodorized kerosene, 8% oxygen-containing silicon oil and 20% silicon powder.

Baking: the soaked rough rubber bands are taken out of the surface treatment solution after soaking and baked them at a high temperature of 200-250° C.

Example 2

Preparation of a production raw material: 55% by weight percent vinyl-terminated polydimethylmethylvinyl-siloxane, 35% by weight percent silica and 10% by weight percent hydroxy-terminated polydimethylsiloxane are selected and mixed together by sufficient stirring to give a paste ready for use;

Forming: the above-described production raw material is fed into forming molds to produce rough rubber bands at a high temperature of 200° C.;

Surface treatment: the rough rubber bands are soaked in a surface treatment solution for 15 seconds, wherein the formulation of the surface treatment solution contains by weight percent 45% methyl vinyl silicone rubber, 32% deodorized kerosene, 8% oxygen-containing silicon oil and 15% silicon powder.

Baking: the soaked rough rubber bands are taken out of the surface treatment solution after soaking and baked them at a high temperature of 200-250° C.

Example 3

Preparation of a production raw material: 60% by weight percent vinyl-terminated polydimethylmethylvinyl-siloxane, 30% by weight percent silica and 10% by weight percent hydroxy-terminated polydimethylsiloxane are selected and mixed together by sufficient stirring to give a paste ready for use;

Forming: the above-described production raw material is fed into forming molds to produce rough rubber bands at a high temperature of 200° C.;

Surface treatment: the rough rubber bands are soaked in a surface treatment solution for 12 seconds, wherein the formulation of the surface treatment solution contains by weight percent 45% methyl vinyl silicone rubber, 32% deodorized kerosene, 8% oxygen-containing silicon oil and 15% silicon powder.

Baking: the soaked rough rubber bands are taken out of the surface treatment solution after soaking and baked them at a high temperature of 200-250° C.

Example 4

Preparation of a production raw material: 60% by weight percent vinyl-terminated polydimethylmethylvinyl-siloxane, 30% by weight percent silica and 10% by weight percent hydroxy-terminated polydimethylsiloxane are selected and mixed together by sufficient stirring to give a paste ready for use;

Forming: the above-described production raw material is fed into forming molds to produce rough rubber bands at a high temperature of 200° C.;

Surface treatment: the rough rubber bands are soaked in a surface treatment solution for 15 seconds, wherein the formulation of the surface treatment solution contains by weight percent 42% methyl vinyl silicone rubber, 30% deodorized kerosene, 8% oxygen-containing silicon oil and 20% silicon powder.

Baking: the soaked rough rubber bands are taken out of the surface treatment solution after soaking and baked them at a high temperature of 200-250° C.

Example 5

Preparation of a production raw material: 65% by weight percent vinyl-terminated polydimethylmethylvinyl-siloxane, 28% by weight percent silica and 7% by weight percent hydroxy-terminated polydimethylsiloxane are selected and mixed together by sufficient stirring to give a paste ready for use;

Forming: the above-described production raw material is fed into forming molds to produce rough rubber bands at a high temperature of 200° C.;

Surface treatment: the rough rubber bands are soaked in a surface treatment solution for 10 seconds, wherein the formulation of the surface treatment solution contains by weight percent 40% methyl vinyl silicone rubber, 35% deodorized kerosene, 5% oxygen-containing silicon oil and 20% silicon powder.

Baking: the soaked rough rubber bands are taken out of the surface treatment solution after soaking and baked them at a high temperature of 200-250° C.

Example 6

Preparation of a production raw material: 65% by weight percent vinyl-terminated polydimethylmethylvinyl-siloxane, 28% by weight percent silica and 7% by weight percent hydroxy-terminated polydimethylsiloxane are selected and mixed together by sufficient stirring to give a paste ready for use;

Forming: the above-described production raw material is fed into forming molds to produce rough rubber bands at a high temperature of 200° C.;

Surface treatment: the rough rubber bands are soaked in a surface treatment solution for 15 seconds, wherein the formulation of the surface treatment solution contains by weight percent 48% methyl vinyl silicone rubber, 25% deodorized kerosene, 9% oxygen-containing silicon oil and 18% silicon powder.

Baking: the soaked rough rubber bands are taken out of the surface treatment solution after soaking and baked them at a high temperature of 200-250° C.

Example 7

Preparation of a production raw material: 70% by weight percent vinyl-terminated polydimethylmethylvinyl-siloxane, 25% by weight percent silica and 5% by weight percent hydroxy-terminated polydimethylsiloxane are selected and mixed together by sufficient stirring to give a paste ready for use;

Forming: the above-described production raw material is fed into forming molds to produce rough rubber bands at a high temperature of 200° C., Surface treatment: the rough rubber bands are soaked in a surface treatment solution for 12 seconds, wherein the formulation of the surface treatment solution contains by weight percent 48% methyl vinyl silicone rubber, 25% deodorized kerosene, 9% oxygen-containing silicon oil and 18% silicon powder.

Baking: the soaked rough rubber bands are taken out of the surface treatment solution after soaking and baked them at a high temperature of 200-250° C.

Example 8

Preparation of a production raw material: 70% by weight percent vinyl-terminated polydimethylmethylvinyl-siloxane, 25% by weight percent silica and 5% by weight percent hydroxy-terminated polydimethylsiloxane are selected and mixed together by sufficient stirring to give a paste ready for use;

Forming: the above-described production raw material is fed into forming molds to produce rough rubber bands at a high temperature of 200° C.;

Surface treatment: the rough rubber bands are soaked in a surface treatment solution for 10 seconds, wherein the formulation of the surface treatment solution contains by weight percent 40% methyl vinyl silicone rubber, 35% deodorized kerosene, 5% oxygen-containing silicon oil and 20% silicon powder.

Baking: the soaked rough rubber bands are taken out of the surface treatment solution after soaking and baked them at a high temperature of 200-250° C.

Example 9

Preparation of a production raw material: 75% by weight percent vinyl-terminated polydimethylmethylvinyl-siloxane, 20% by weight percent silica and 5% by weight percent hydroxy-terminated polydimethylsiloxane are selected and mixed together by sufficient stirring to give a paste ready for use;

Forming: the above-described production raw material is fed into forming molds to produce rough rubber bands at a high temperature of 200° C.;

Surface treatment: the rough rubber bands are soaked in a surface treatment solution for 10 seconds, wherein the formulation of the surface treatment solution contains by weight percent 45% methyl vinyl silicone rubber, 30% deodorized kerosene, 9% oxygen-containing silicon oil and 16% silicon powder.

Baking: the soaked rough rubber bands are taken out of the surface treatment solution after soaking and baked them at a high temperature of 200-250° C.

Example 10

Preparation of a production raw material: 75% by weight percent vinyl-terminated polydimethylmethylvinyl-siloxane, 20% by weight percent silica and 5% by weight percent hydroxy-terminated polydimethylsiloxane are selected and mixed together by sufficient stirring to give a paste ready for use;

Forming: the above-described production raw material is fed into forming molds to produce rough rubber bands at a high temperature of 200° C.;

Surface treatment: the rough rubber bands are soaked in a surface treatment solution for 12 seconds, wherein the formulation of the surface treatment solution contains by weight percent 40% methyl vinyl silicone rubber, 35% deodorized kerosene, 5% oxygen-containing silicon oil and 20% silicon powder.

Baking: the soaked rough rubber bands are taken out of the surface treatment solution after soaking and baked them at a high temperature of 200-250° C.

After the pull test with a pulling force of 10 pounds, a rubber band made according to the above-described embodiments 1-10 can be repeatedly stretched to a length of 20-30 cm without breaking and with no cracks, and does not deform after release. The ingredient, silica gel, is environmentally friendly non-toxic, odorless, and difficult to age. As compared with a rubber-based rubber band, if a 10 pound pulling force is employed to test the rubber band, it generally cracks, breaks, or deforms when it has not yet been stretched to a length of 15 cm. Obviously, the rubber band of the present invention is superior to a traditional rubber band in terms of elasticity, environmental friendliness and durability.

When the rubber band according to any of the above-mentioned embodiments is used to tie hair, it has a non-slip property, no cracks after stretching and a long service life and is unlikely to entangle the hair.

However, what are described above are only preferred embodiments of the invention, but not to limit the technical solution of the present invention. Any slight alterations, equivalent changes and modifications to the above embodiments based on the technical substance of the present invention shall fall within the scope of the technical solution of the present invention.

What is claimed is:

1. A manufacturing method for a rubber band, comprising the following steps:

Step 1: mixing and stirring by weight percent 50%-80% vinyl-terminated polydimethylmethylvinylsiloxane, 19%-40% silica and 1%-10% hydroxy-terminated polydimethylsiloxane into a paste as a production raw material;

Step 2: feeding the aforementioned production raw material into forming molds to produce rough rubber bands;

Step 3: soaking the rough rubber bands in a surface treatment solution for a certain time period, wherein the surface treatment solution comprises by weight percent 40%-50% methyl vinyl silicone rubber, 30%-35% deodorized kerosene, 7%-10% oxygen-containing silicon oil and 10%-20% silicon powder; and Step 4: taking the soaked rough rubber bands out of the surface treatment solution after soaking and baking the soaked rough rubber bands at a high temperature of 200-250° C.

* * * * *